Sept. 9, 1930.  G. Q. LEWIS  1,775,249
RESILIENT CENTER BEARING FOR VEHICLES
Filed March 16, 1925
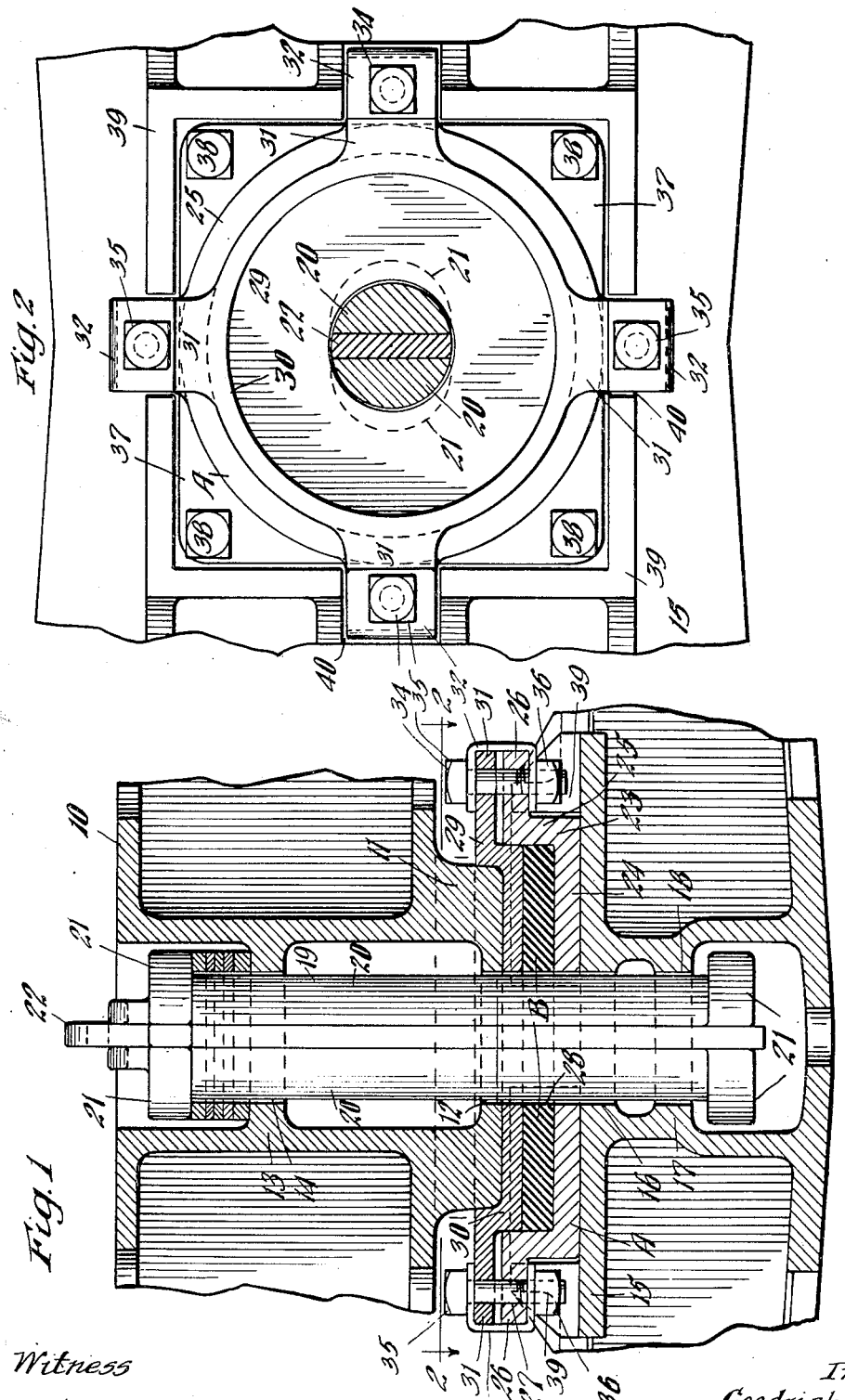
Witness
Wm. Geiger
Inventor
Goodrich Q. Lewis
By George I. Haight
Atty.

Patented Sept. 9, 1930

1,775,249

UNITED STATES PATENT OFFICE

GOODRICH Q. LEWIS, OF WHEATON, ILLINOIS, ASSIGNOR TO W. H. MINER, INC., OF CHICAGO, ILLINOIS, A CORPORATION OF DELAWARE

RESILIENT CENTER BEARING FOR VEHICLES

Application filed March 16, 1925. Serial No. 15,861.

This invention relates to resilient center bearings for vehicles.

In the operation of railroads, an excessive amount of wear and vibration occur between the body and truck bolsters of a railway car at the center bearing connections, which is due to the tremendous pounding and turning between the unyielding structures of which the bearing connection is usually composed.

An object of my invention is to provide resilient cushioning means associated with the center bearing in a novel manner, being arranged to be interposed between the body and truck bolsters of the car to absorb the shocks therebetween.

A further object of the invention is to provide cushioning means of a novel character, which is capable of enduring the strains to which the same is subjected, such cushioning means including preferably a mass of live rubber enclosed in a container in such manner as to be yieldably maintained under initial compression, whereby the rubber is protected from abrasion, laceration and deterioration which would rapidly occur under ordinary conditions, and by which arrangement the vibration between the parts is minimized.

Other and further objects of the invention will more fully and clearly appear from the description and claims hereinafter following.

In the drawing forming a part of this specification, Figure 1 is a fragmentary, vertical, sectional view of the body and truck bolsters, and center bearing, showing my invention in connection therewith; and Figure 2 is a partial sectional, and partial plan view of the invention on the line 2—2 of Figure 1.

Referring more particularly to the drawings, 10 indicates a fragment of a body bolster of a railway car, provided with center bearing means including a centrally disposed boss 11 on the under surface of the bolster having an opening 12 therein, and a supporting web 13, provided with an opening 14. The truck bolster is indicated by the numeral 15, and includes a center bearing portion having a central opening 16, and a web 17 provided with an opening 18. The truck bolster is also provided with certain retaining means for the cushioning device which will be hereinafter described in detail. The bolsters 10 and 15 are adapted to be pivotally connected together and held against accidental vertical separation by means of a king pin 19, of well-known form, such pin including two substantially semi-cylindrical sections 20—20, such sections being provided at their opposite ends with outwardly projecting flanges 21—21, the sections 20—20 being adapted to extend through the openings 12 and 14 of the body bolster and openings 16 and 18 of the truck bolster, a spreader 22 being thereafter inserted between the sections for holding the same apart, whereby the upper flanges of such sections rest upon the web 13, and the flanges 21—21 on the lower portions of the sections are disposed below the web 17 of the truck bolster, so that the two bolsters are pivotally connected together and held against vertical separation.

In carrying out my invention, I provide a resilient unit comprising a container A, enclosing a resilient element B, the unit being in the general nature of a center wear plate, which is adapted to be associated with the center bearing of the car and interposed between the body and truck bolsters thereof.

The container A, as shown, comprises an annular dish-shaped receptacle 23, including a bottom wall 24, having an aperture 25′ therein for the passage of the king pin 19, and integrally formed with the bottom wall 24 at its extremities is an annular wall 25. The edges of the receptacle are provided with outturned, integrally formed projections or ears 26, such ears being preferably four in number and spaced equidistantly, circumferentially of the edge of the receptacle. Each ear is provided with a perforation 27 for a purpose hereinafter referred to.

Adapted for disposition in the receptacle 23 is the resilient element B, which is preferably in the form of live rubber, such element having a central opening 28 for the passage of the king pin.

Cooperating with the receptacle 23, and the contained resilient mass B, are follower acting means in the form of a plate 29, which, when the device is assembled, fits in the receptacle 23 in such a manner as to snugly and slidably engage the interior surfaces of the annular wall 25, the plate being provided with an aperture for the passage of the king bolt, and also provided with a female depression 30 in its upper surface for the reception of the center bearing male member 11 formed upon the body bolster 10. The plate 29 is also provided with outturned, offset ears 31, preferably four in number, and corresponding in position with the ears 26 on the receptacle 23, each of such ears being provided with an aperture therethrough.

Associated with the ears 26 and 31 are retaining means in the form of U-shaped clips 32, the legs 33 of each of such clips being disposed upon the outer sides of a related pair of ears on the receptacle 23 and plate 29, and the bight of each clip is of a length to normally permit a clearance between the ears 31 and 26, it being understood that the rubber is compressed so that the clips may be secured in position. Bolts 34 are provided for each set of ears and clips, each of such bolts having its head 35 bearing upon the outer side of the adjacent clip, the shank of such bolt extending through the clip and the apertures in the adjacent ears, and a nut 36 being threaded on the bolt so as to bear against the opposite outer face of the clip.

In order to maintain the resilient unit in position on the truck bolster, I provide the upper surface of the truck bolster with a rectangular plate 37 which is rigidly affixed to the bolster 15 by suitable retaining bolts 38. The plate 37 includes an upstanding rib 39 surrounding the cushioning unit, such rib being provided at intervals with notches 40 for the reception of the ears 26 of the receptacle, so as to prevent rotation of said cushioning unit relative to the truck bolster, the wall 25 of the receptacle being adapted to abut against the rib to prevent lateral displacement thereof.

In assembling the shock absorbing device, the quantity of live rubber B is placed in the receptacle, such rubber in its original state being of considerably greater depth than the receptacle. The follower plate 29 is then placed in position and pressure applied to the plate so as to compress the rubber into the receptacle, until the annular portion of the follower has a telescopic fit with the annular walls of the receptacle, the pressure which is necessary to compress the rubber so that the clips may be attached, preferably being greater than that which would occur due to the imposition of the dead weight of the car thereon in service. The clips are then applied upon the ears and the bolts secured in position. The device thus assembled has the general characteristics of an ordinary wear plate and is adapted to be interposed between the bolsters, and the king pin passed therethrough in the same manner in which a wear plate is placed in position.

By this arrangement, the rubber in the container is maintained under continuous compression, and shocks imparted to the device are absorbed, relative approach of the plate 29 and receptacle 23 being permitted by the sliding action of the ears upon the bolts, the clips and bolts serving to limit the expansion of the rubber so as to continuously maintain the same under initial compression. It should also be observed that the plate 37 retains the unit in position on the truck bolster and prevents rotation thereof, and such unit also includes means for the reception of the boss on the body bolster, which likewise prevents lateral displacement of the bolsters relative to each other. In addition, it will be noted that vibration between the parts is entirely eliminated. By the arrangement shown, chafing or scoring or excessive expansion in any direction of the live rubber, is positively prevented, thus insuring long life to the cushioning medium.

I claim:

1. In a center bearing, the combination with the body and truck bolsters of a vehicle; of non-metallic, resilient cushioning means under initial compression forming a part of the supporting structure of the center bearing proper and interposed between said body bolster and truck bolster, and means for confining the cushioning means against enlargement in all directions.

2. In a center bearing, the combination with the body and truck bolsters of a vehicle; of cushioning means associated with said bearing and interposed between said body and truck bolsters, said cushioning means including a resilient element; and means for maintaining said element under compression greater than that normally caused by the dead weight of the vehicle imposed on said cushioning means.

3. In a construction of the character described, the combination with a truck bolster having a cup-shaped container associated therewith, said container having a king-pin opening in its bottom wall; of a plate telescopically fitting within the wall defining the cup-shaped container and held thereby against radial displacement with reference to said truck bolster, said plate being provided on its outer surface with means defining a socket, and with a central king-pin opening coinciding with the king-pin opening in said container; a body bolster having a center bearing member rotatably disposed in the socket in said container; a cushioning pad element disposed in said container and interposed between the bottom thereof and said plate, said cushioning element being provided with an opening for the passage of the king-pin; and a king-pin extending through the center bearings of said truck and body bolsters and through said plate, resilient element, and cup-shaped member.

4. In a center bearing for railway cars provided with co-operating body and truck bolster members, the combination with a supporting plate fixed on one of said bolster members; of a second supporting plate, said second supporting plate and the other bolster member having inter-engaging bearing means comprising a bearing seat and a co-operating bearing projection; non-metallic yielding cushioning means interposed between said plates; means for opposing outward expansion of said cushioning means; and means for securing said plates together and placing and holding the cushioning means under initial compression.

5. In a center bearing for railway cars provided with body and truck bolster members, the combination with a plate member mounted on one of said bolster members; of a second plate member, said second plate member and the other bolster member having co-operating bearing means thereon providing a swiveled connection therebetween to provide for relative rotation of said bolsters about a vertical axis, one of said plate members having a vertical outer wall providing a seat; non-metallic yielding cushioning means interposed between said plates and disposed within said seat; and means for securing said plate members together and placing the cushioning means under a degree of compression independent of the weight of the car.

6. In a mounting for a car body member, a truck member, a plate engaging one of said members, a seat on the other member formed with vertically disposed edge flanges, a block of non-metallic yielding cushioning means bearing on said plate and disposed in said seat, and means to secure the plate to the seat member and placing and holding the cushioning means under initial compression.

In witness that I claim the foregoing I have hereunto subscribed my name this 10th day of March, 1925.

GOODRICH Q. LEWIS.